United States Patent Office 3,544,439
Patented Dec. 1, 1970

3,544,439
ELECTROPHORETIC COATING PROCESS
Harold A. Wittcoff and William S. Baldwin, Minneapolis, Minn., assignors to General Mills, Inc., a corporation of Delaware
No Drawing. Filed Nov. 13, 1967, Ser. No. 682,524
Int. Cl. B01k *5/02;* C23b *13/00*
U.S. Cl. 204—181    11 Claims

ABSTRACT OF THE DISCLOSURE

An aqueous composition containing a polymeric secondary amine derived from dimerized fat acids, a polybasic carboxylic acid or anhydride thereof, a monofunctional chain stopping agent and optional additives is used to electrophoretically coat metal surfaces.

---

The present invention relates to a process of coating metals and to a composition useful in such process. More particularly, it relates to such a process where a film derived from a composition comprising certain polymeric secondary amines, polybasic carboxylic acids or anhydrides thereof and chain stopping agents is electrolytically deposited from an aqueous medium onto a metal surface.

In recent years a variety of water thinnable paints have been developed. Such paints offer certain advantages over solvent based paints, such as reduced fire risk, lower cost of thinning, ease of cleaning installations and ready application to wet surfaces. Some of these water based paints have been used to coat metal surfaces electrophoretically. Such procedure offers certain additional advantages including the deposition of a relatively uniform film on all parts of the article (over sharp edges and with absence of runs and sags from holes and overlaps), the coating of many articles hitherto unsuited to dipping due to their shape or construction, penetration of the coating into all welds and seams, low wastage of paint and essentially freedom from toxic and unpleasant vapors.

Most, if not all, of the water based paints or primers available prior to the present invention have been deposited on the anode. Because the deposition is at the anode, certain problems have been encountered. In this respect, light pastel films may not be prepared from the conventionally used alkyd resins because of iron contamination at the anode. And such alkyd type formulations become more basic as the paint is consumed and thus dialysis cells or some other means must be employed for removal of the excess ammonia which is commonly used as a dispersant. Still further, there is often a considerable amount of gas formation at the anode which can cause film breakage.

We have now discovered that an aqueous composition containing a polymeric secondary amine derived from polymeric fat acids, a polybasic carboxylic acid or anhydride and a chain stopping agent can be used to electrophoretically coat the surfaces of metals. When the chain stopping agent is acidic, the coating is deposited at the cathode and, as such, the pH of the bath goes from the acid side toward neutrality as the composition is consumed which is desirable for ease of control. Such preferred procedure also overcomes some or all of the disadvantages set forth for deposition at the anode as mentioned hereinabove. Less preferably, the chain stopping agent can be basic and thus the coating is deposited at the anode. Accordingly, our compositions are versatile and allow the ultimate user to deposit the coating on either the cathode or anode. Our composition also have corrosion inhibiting properties due to the presence of the polymeric secondary amine and thus the resulting deposited films act as barriers to corrosion.

As indicated, the composition of the present invention comprises polymeric secondary amines derived from polymeric fat acids, polybasic carboxylic acids or anhydrides and chain stopping agents. The polymeric secondary amines are characterized by the recurring structural unit:

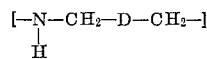

where D is a dimeric fat radical. Such polymers are conveniently prepared by the condensation polymerization of a fatty dinitrile derived from a dimerized fat acid.

The condensation polymerization of the fatty dinitrile is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrogen pressures in the range of 25 to 1000 p.s.i.g. at temperatures in the range of 200 to 290° C.

The preparative reaction is illustrated by the following equation:

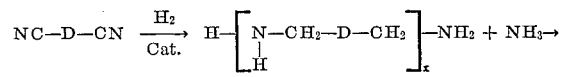

where D is a dimeric fat radical and $x$ is the number of recurring units in the polymer chain. As illustrated in the equation, an ammonia by-product is formed. Such by-product ammonia is removed by "sweeping" the reaction mixture with hydrogen gas. Depending on the reaction conditions employed the polymer products vary in molecular weight from dimers in which $x$ in the foregoing equation is 2 to high molecular weight products in which $x$ is 40 or greater.

A hydrogenation catalyst is employed to carry out the above reaction. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chromium oxide catalyst." Preparation of copper-chromite catalysts is discussed in an article by Connor, Folkers, and Adkins, in the "Journal of the American Chemical Society," vol. 54, pp. 138–45 (1932) and in "Relations of Hydrogen With Organic Compounds Over Copper-Chromium Oxide and Nickel Catalysts" by Homer Adkins, University of Wisconsin Press, Madison, Wis. (1937). The nature of this catalyst is further discussed in an article by Adkins, Burgoyne, and Schneider in the Journal of the American Chemical Society, vol. 72, pp. 2226–29 (1950). Commercially available copper-chromite catalysts often contain amounts of catalyst stabilizers, e.g., barium oxide, calcium oxide, and magnesium oxide. Catalysts containing such stabilizers can be employed in the instant invention if desired. While many types of copper-chromite catalysts are commercially available and are generally useful in the instant invention, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst is not critical. However, the molecular weight of the polymeric secondary amines will vary somewhat depending on the amount of catalyst used. Generally, catalyst in the amount of 1 to 10% by weight, based on the weight of the nitrile charge, is sufficient. Larger and smaller amounts of catalysts can be employed if desired.

The dinitrile starting materials for preparing the polymeric secondary amines are the dinitriles prepared from dimerized fat acids. Relatively pure dimerized fat acids can be distilled from commercially available polymeric fat acid mixtures. The polymerized fat acids are prepared by polymerizing ethylenically unsaturated monobasic carboxylic acids having 16 to 22 carbon atoms or the lower alkyl esters thereof. The preferred acids are the mono and polyolefinically unsaturated 18 carbon atom acids. Representative octadeconic acids are 4-octadecenoic, 5-octadecenoic, 6-octadeconic (petroselinic), 7-octadecanoic, 8-octadecenoic, cis-9-octadeconioc (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo-eleostearic) and the like. A representative 18 carbon atom acid having more than three double bonds is moroctic acid which is indicated to be 4,8,12,15-octadecatatraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18 - eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization products by vacuum distillation at low pressures, solvent extraction or other known separation procedures. The polymerization product varies somewhat depending on the starting fat acid or mixture thereof and the polymerization technique employed—i.e. thermal, catalytic, particular catalyst, conditions of pressure, temperature etc. Likewise, the nature of the dimerized acids separated from the polymerization product also depend somewhat on these factors although such acids are functionally similar.

Analysis of dimerized acids prepared from linoleic acid rich starting materials using heat alone or heat plus a catalyst, such as an acid or alkaline clay, shows that the product contains structurally similar acids having monocyclic tetra-substituted cyclohexene ring structures as well as acids with two and three rings, such additional rings generally being fused to the six carbon atom ring. Additionally, the clay catalyzed dimerized acids have been shown to contain some aromatic rings according to ultraviolet and infrared spectroscopy. These aromatic rings are believed to be formed by hydrogen transfer (by catalytic action of clay) from the substituted cyclohexene ring to form a substituted benzene ring. Such acids are believed to comprise less than about 20% by weight of the dimerized fat acid. Polymerization of pure oleic acid using a clay catalyst has been shown to yield a mixture of dimerized fat acids of which approximately 25–30% by weight have a tetrasubstituted cyclohexene ring with the remainder being non-cyclic. However, when mixtures of oleic and linoleic acids (such as from tall oil) are polymerized, the resulting dimerized fat acid contains little if any dimer having a non-cyclic structure.

It is apparent from the above and other published analyses that the polymerization of the ethylenically unsaturated acids yields complex products. The dimer fraction thereof, generally consisting of a mixture of acids, can be assigned the formula:

HOOC—D—COOH where D is a divalent hydrocarbon group containing 30 to 42 carbon atoms. It is also apparent that said divalent hydrocarbon group is complex since a mixture of acids normally results from the polymerization and subsequent fractionation. These acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Such dimeric acids may be considered as having a theoretical idealized, general formula as follows:

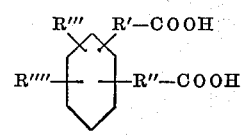

where R' and R" are divalent hydrocarbon radicals, R''' and R'''' are monovalent hydrocarbon radicals and the sum of the carbon atoms in R'—R'''' is 24–26. The ring contains one double bond. It is also understood that the R'—R'''' radicals may form one or more additional cyclic structures which are generally fused to the first ring. It is further understood that the ring or rings may be saturated such as where the dimer acids are hydrogenated under conditions which convert the unsaturated acids to the corresponding saturated compounds.

As a practical matter, the dimeric fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of a relatively pure dimer fraction (98.5% dimer) obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, one significant component being

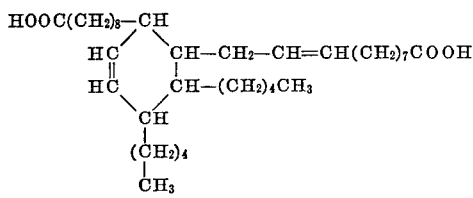

The dinitrile used in the preparation of the polysecondary amine of the example to follow was prepared from such mixture of acids. It is also to be understood that the corresponding saturated dimeric fat acids are useful in preparing the dinitriles and thence the polymeric secondary amines employed in the present invention. Hydrogenation of the above mixture of acids derived from the tall oil fatty acids using palladium catalyst yields the corresponding saturated acids, one significant component thereof being

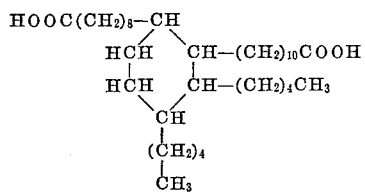

The dimerized fat acid is converted to the corresponding dinitriles by reaction with ammonia under nitrile forming conditions. The details of this reaction are set forth in Chapter 2 of "Fatty Acids and Their Derivatives" by A. W. Ralston, John Wiley & Sons, Inc., New York (1948). If desired, the dinitrile may then be purified to the desired degree by vacuum distillation or other suitable means.

In theory, the formation of the polymeric secondary amine proceeds through the preliminary reduction of the dinitrile to the diprimary diamine followed by conversion of the diamine to the polymeric secondary amine. Accordingly, this provides an alternate route for the preparation of the polymers. In such alternate route, the diamines are formed separately and then converted to the polymeric seconadry amines under the conditions previously described, although it is possible to use somewhat milder conditions. From a practical standpoint, there may be certain advantages in carrying out the preparation of the polymeric secondary amines in two steps since it makes possible the removal of any by-products formed in the first step—i.e. the formation of diprimary diamine—and thus enhances the purity of the final product. In addition, the milder conditions used to form the polymeric secondary amine from the diprimary diamine results in less degradation and thus further enhances the purity of the final product.

Generally, the end groups of the polymeric secondary amines will be either amine groups or nitrile groups. Where the polymers are prepared by condensing diamines, the end groups will generally be primary amines:

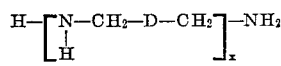

where D and $x$ are as previously defined. Where the dinitrile is used as the starting material and the reaction time in short, the end groups will be mainly nitrile groups:

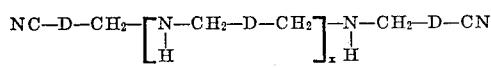

When dinitriles are used in the starting material, under many reaction conditions a mixture of polymer will be obtained, some chains terminating in nitrile groups and other chains terminating in amine groups. These polymeric secondary amines have the following general structural formula:

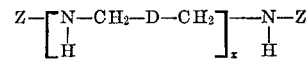

where Z is either H or —$CH_2$—D—CN. Where severe reaction conditions are utilized, the dehydration of functional groups may cause some chains to terminate in hydrocarbon groups.

The following example illustrates the preparation of the polymeric secondary amines useful in the present invention.

EXAMPLE A

Undistilled dimer dinitrile prepared from distilled dimer acid as set forth above and water wet Raney nickel catalyst (2½% by weight based on the weight of the dinitrile) were charged into a stirred autoclave. The autoclave was flushed with hydrogen and sealed under 200 p.s.i.g. hydrogen pressure with continuous venting of hydrogen. The system was heated to 230° C. with the temperature rising to 255° C. due to the reaction exotherm. The temperature was brought back to 230° C and the hydrogenation was continued for 2½ hours. The reaction mixture was then cooled and filtered to remove the catalyst. There were obtained a polymeric secondary amine having the formula set forth hereinabove wherein $x$ is an average of approximately 4 and the end groups are essentially all —$NH_2$ groups. Such polymeric secondary amine had an amine number of 114.0 and a molecular weight based on primary amine end groups of approximately 1860.

Any of a wide variety of polycarboxylic acids or anhydrides having from 2 to about 40 carbon atoms of aliphatic or aromatic structure, either substituted or unsubstituted, may be used in the composition and process of the present invention. Among the preferred acids are the following: phthalic, terephthalic, isophthalic, azelaic, sebacic, fumaric, oxalic and the like. Anhydrides can also be used and representative of these are maleic anhydride, succinic anhydride, trimellitic anhydride and the like. It is understood, of course, that in addition to the specific acids an anhyrides referred to, other saturated or unsaturated polycarboxylic acids and anhydrides having straight or branched chains may be used, as well as acids having various substituents such as hydroxyl groups.

The chain stopping agent is a low molecular weight monofunctional compound. When the composition is to be deposited at the cathode, the said agent is acidic and preferably a monocarboxyl acid of five or less carbon atoms. Especially preferred acids are formic and acetic acid. When the composition is to be deposited at the anode, the said agent is basic and preferably ammonia, ammonium hydroxide or a low molecular weight aliphatic amine such as methyl amine. The chain stopping agent performs at least two functions in the compositions and process. First, it reacts with and forms salt groups with either a portion of the amine groups of the polymeric secondary amine or a portion of the acid groups of the polycarboxylic acid, depending upon whether it is acidic or basic. Such salt groups are thus temporarily blocked from further reaction under ambient conditions and, accordingly, the formation of high molecular weight polymers in the aqueous dispersion is inhibited. Secondly, the chain stopping agent aids in the dispersion of the reactants in the aqueous medium through the formation of the salt groups. The dispersion also becomes more ionic and thus the deposition of films therefrom on the electrodes is facilitated.

The aqueous compositions of the invention contain from about 3 to 12% by weight total of the defined reactive ingredients, namely the polymeric secondary amine, the polycarboxylic acid (or anhydride thereof) and the chain stopping agent. When such active ingredients are used in an amount much above the upper limit, the composition becomes too viscous for the production of coatings of good quality. Below the lower limit, the film is deposited at a slow rate and may not be of the desired thickness.

The equivalent ratio of polybasic carboxylic acid to polymeric secondary amine is preferably in the range of about 0.5–1.0 to 1.0. The equivalent ratio of the chain stopping agent to the polymeric secondary amine is preferably in the range of .25–.75 to 1.0 with 0.5 to 1.0 being especially preferred.

The main portion of the composition is made of water which is preferably deionized water. The composition may also contain pigments such as iron oxide, titanium dioxide, lead oxide, carbon black, and the like. Various other known additives can also be included such as organic solvents. Representative of such materials are alcohols and ethers which are preferably water soluble. Butyl Cellosolve is a particularly preferred additive as it aids in stabilizing the dispersion and also tends to produce more level and uniform films. Fillers such as amorphous silicas and anti-foaming agents may also be used to further enhance the coating and/or alleviate problems encountered in carrying out the process. It is to be understood that the compositions will be more or less stable depending somewhat on the selection of the particular polymeric secondary amine, polybasic acid, chain stopping agent, and optionally the pigment and other additives.

The composition is preferably placed in a metal container which acts as one of the electrodes and the metal surface to be coated is immersed in the composition and connected to a direct current source such that said metal acts as the other electrode. The composition is preferably stirred during the coating or plating operation to maintain a relatively uniform dispersion of the various ingredients.

The plating is carried out for a few seconds to several minutes or more, the length of time varying somewhat as to the voltage and current efficiency. Preferably the current is passed through the composition for 30 seconds to two minutes at about 20 to 60 volts. It is understood, however, that lower or higher voltages may be used it being only necessary that the time and voltage be sufficient to deposit a film of the desired thickness on the metal article.

When the deposited film has reached the desired thickness, the current is cut and the coated panel is removed from the bath, preferably washed with water to remove loosely adhering materials and then baked at temperatures of about 120° C. to 170° C., preferably 150° C., for a few minutes to an hour or more. Baking at about 150° C. for ½ hour is entirely suitable and preferred. The baking causes the polybasic acid to preferentially react with and cure or cross-link the polymeric secondary amine. The chain stopping agent, such as formic acid or ammonia, is released and removed by volatilization at the designated baking temperatures. The surfaces of the metal which had been immersed are thus coated to a thickness of about 0.5 to 1.0 mil, such cured coatings generally having good water resistance, excellent flexibility and alkali resistance and fair resistance to organic solvents.

The hardness and overall appearance varies somewhat depending on the particular ingredients of the composition and especially on the polybasic acid used.

The following examples further illustrate the compositions and process of the present invention but are not to be considered as limiting.

EXAMPLE I

Five hundred seventy six grams (1.16 eq.) of polymeric secondary amine as prepared in Example A were combined with 26.4 gm. (.55 eq.) formic acid, 254.0 gm. ferric oxide pigment, 28.8 gm. amorphous silica filler (Cabosil A–5), 240 gm. butyl Cellosolve solvent and 24 gm. antifoam agent (Dow Corning 21) and mixed on a high speed paint mixer. Seven hundred eight grams of hot water (deionized, 80° F.) were combined with 95.7 gm. of the above composition and 7.5 gm. terephthalic acid and blended in a Waring Blendor. The resulting emulsion was placed in a two liter stainless steel beaker which was connected as the anode. A steel panel (4" x 6" x 24 gauge—Bonderite 100) was connected as the cathode and immersed in the composition which was continuously agitated with a magnetic stirrer. Current was then passed through the composition for one minute at 40 volts. The current was cut and the panel was removed, washed with water and baked at 150° C. for ½ hour. The coating on the panel was hard, tackfree and of good appearance—smooth and uniform.

EXAMPLES II–XI

Example I was repeated except that other acids were used in place of the terephthalic acid and various of the panels were plated at different voltages. The specific acids, amounts thereof added to the 95.7 gms. of base composition and 708 gms. of water, voltages, and results are set forth in the following table.

| Exp. | Acid | Amount (gms.) | Volts | Coating Appearance | Tack | Hardness |
|---|---|---|---|---|---|---|
| II | Phthalic anhydride | 6.7 | 40 | Rough | Tacky | Soft. |
| III | Azelaic | 8.5 | 40 | do | Slight tack | Slightly soft. |
| IV | Trimellitic anhydride | 5.77 | 40 | do | None | 4B. |
|  | do |  | 60 | do | do | 4B. |
| V | Maleic anhydride | 4.4 | 40 | Slightly rough | Slight tack | Soft. |
| VI | Sebacic | 9.1 | 40 | Rough | do | Do. |
| VII | Isophthalic | 7.5 | 40 | do | None | Slightly soft. |
|  | do |  | 20 | Smooth | do | Do. |
|  | do |  | 60 | do | do | Do. |
| VIII | Oxalic | 5.7 | 40 | Rough | Tacky | Soft. |
| IX | Fumaric | 5.24 | 40 | Slightly rough | do | Slightly soft. |
| X | Maleic | 5.24 | 40 | do | do | Soft. |
|  | do |  | 60 | Smooth | do | Do. |
|  | do |  | 20 | do | do | Do. |
| XI | Succinic anhydride | 4.53 | 40 | do | do | Do. |
|  | do |  | 20 | do | do | Do. |
|  | do |  | 60 | do | do | Do. |

EXAMPLE XII

Fifty grams of polymeric secondary amine as prepared in Example A were combined with 50 grams of butyl Cellosolve and heated to 50° C. Then 7.9 gm. phthalic anhydride was added with stirring and the resulting mixture was added to 600 ml. hot water containing an excess of ammonium hydroxide to form an emulsion. Panels were then coated as in Example I except that the panels were connected as the anode and the current was passed through the compositions for 1, 2 and 4 minutes for the three separate panels. The resulting baked coatings were hard, tackfree and of good appearance.

While the coatings of the above examples vary as to appearance and hardness, they are all flexible and have good adhesion to the metal surface. Additionally, they provide a corrosion inhibiting barrier. The process of the present invention is valuable in coating metals in addition to iron and steel, particularly conductive metals such as zinc, aluminum, magnesium alloys and the like.

It is to be understood that the invention is not to be limited to the exact details of operation or the exact compositions and processes shown and described, as obvious modifications and equivalents will be apparent to those skilled in the art and the invention is to be limited only by the scope of the appended claims.

The embodiments of the invention in which an exclusive property of privilege is claimed are defined as follows:

1. The process of forming a coating on a metal surface from an aqueous composition containing a polysecondary amine, a polybasic carboxylic acid or anhydride thereof having from 2 to about 40 carbon atoms and a monofunctional chain stopping agent which comprises immersing the metal surface in the aqueous composition, passing an electric current through the aqueous composition to electrophoretically provoke a deposit of the reactive ingredients thereof onto the metal surface, cutting the current, removing the coated metal surface from the aqueous composition and then curing the coating on the metal surface at temperature of 120 to 170° F., said polysecondary amine having the recurring structural unit

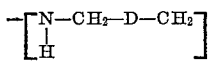

where D is the divalent hydrocarbon group of a dimerized fat acid prepared from an ethylenically unsaturated monocarboxylic acid of 16 to 22 carbon atoms, said polybasic carboxylic acid or anhydride thereof and the polysecondary amine being present in the aqueous composition in an equivalent ratio of about 0.5–1.0 to 1.0, said monofunctional chain stopping agent and the polysecondary amine being present in the aqueous composition in an equivalent ratio of about .25–.75 to 1.0 and said aqueous composition containing about 3 to 12% by weight total of the polysecondary amine, polybasic carboxylic acid or anhydride thereof and monofunctional chain stopping agent.

2. The process of claim 1 wherein the polysecondary amine has the structural formula:

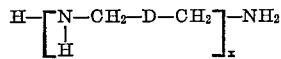

where $x$ is an integer of 2 to about 40.

3. The process of claim 2 wherein D is the divalent hydrocarbon radical of a dimerized fat acid prepared from one or more ethylenically unsaturated monocarboxylic acids of 18 carbon atoms.

4. The process of claim 3 wherein the ethylenically unsaturated monocarboxylic acids of 18 carbon atoms comprise a mixture rich in linoleic acid, the polycarboxylic acid is terephthalic acid, the monofunctional chain stopping agent is formic acid, the equivalent ratio of the terephthalic acid to the polymeric secondary amine is 1.0 to 1.0, and the equivalent ratio of the formic acid to the polysecondary amine is 0.5 to 1.0.

5. The process of claim 4 wherein the aqueous composition also contains a pigment, an amorphous silica filler, an anti-foam agent, and butyl cellosolve, the metal is steel, the coated metal surface is washed with water prior to curing and the curing is carried out at about 150° C.

6. The process of claim 1 wherein the polybasic carboxylic acid is a dicarboxylic acid.

7. The process of claim 1 wherein the monofunctional chain stopping agent is acidic and the deposit is electrophoretically provoked on the metal surface as the cathode.

8. The process of claim 7 wherein the monofunctional acidic chain stopping agent is a monocarboxylic acid of 1 to 5 carbon atoms.

9. The process of claim 1 wherein the monofunctional chain stopping agent is basic and the deposit is electrophoretically provoked on the metal surface as the anode.

10. The process of claim 9 wherein the monofunctional basic chain stopping agent is ammonium hydroxide.

11. The process of claim 1 wherein the aqueous composition also contains a pigment.

References Cited

UNITED STATES PATENTS 2,450,940  10/1948  Cowan et al. _____ 260—18 X
2,767,089  10/1956  Renfrew et al. _____ 260—18 X HOWARD S. WILLIAMS, Primary Examiner U.S. Cl. X.R.

260—18

PO-1050
(5/69)

UNITED STATES PATENT OFFICE
CERTIFICATE OF CORRECTION

Patent No. 3,544,439  Dated December 1, 1970

Inventor(s) Harold A. Wittcoff, William S. Baldwin

It is certified that error appears in the above-identified patent and that said Letters Patent are hereby corrected as shown below:

Column 2, line 28, the right-hand portion of the formula rea

"$NH_3 \rightarrow$"   should read   --$NH_3 \uparrow$--;

line 54, "Relations" should read --Reactions--. Column 4, line 48, "24-26" should read --24-36--. Column 5, line 73, "polymer" should read --polymers--. Column 6, line 6, "dehydration" should read --degradation--; line 38, "gacic" should read --bacic--; line 42, "an" should read --and--. Column 8, line 63, "compositions" should read --composition-Column 9, line 18, "temperature" should read --temperatures- Signed and sealed this 4th day of May 1971.

(SEAL)
Attest:

EDWARD M. FLETCHER, JR.
Attesting Officer

WILLIAM E. SCHUYLEF
Commissioner of Pat